US010589440B2

(12) United States Patent
Ursell et al.

(10) Patent No.: US 10,589,440 B2
(45) **Date of Patent: *Mar. 17, 2020**

(54) ANGLE DIVIDER FOR MITER SAW

(71) Applicant: Affinity Tool Works, LLC, Troy, MI (US)

(72) Inventors: Mike Ursell, Bloomfield Hills, MI (US); Connor Ursell, Bloomfield Hills, MI (US); Ken Neilson, Rochester Hills, MI (US)

(73) Assignee: AFFINITY TOOL WORKS, LLC, Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/253,125

(22) Filed: Jan. 21, 2019

(65) Prior Publication Data

US 2019/0152091 A1 May 23, 2019

Related U.S. Application Data

(63) Continuation-in-part of application No. 15/372,551, filed on Dec. 8, 2016, now Pat. No. 10,183,395.

(60) Provisional application No. 62/264,415, filed on Dec. 8, 2015.

(51) Int. Cl.

| | |
|---|---|
| ***B27G 5/02*** | (2006.01) |
| ***B23D 59/00*** | (2006.01) |
| ***G01B 3/56*** | (2006.01) |
| ***B25H 7/00*** | (2006.01) |
| *B23D 45/14* | (2006.01) |
| *B23D 47/04* | (2006.01) |

(52) U.S. Cl.

CPC .......... *B27G 5/023* (2013.01); *B23D 59/002* (2013.01); *B25H 7/00* (2013.01); *G01B 3/56* (2013.01); *B23D 45/14* (2013.01); *B23D 47/04* (2013.01)

(58) Field of Classification Search

CPC ... B25H 1/04; B25H 1/14; B25H 1/16; B25H 3/00; G01B 3/04; G01B 3/56

USPC .......................................................... 33/456

See application file for complete search history.

(56) References Cited

U.S. PATENT DOCUMENTS 361,243 A * 4/1887 Struble .................... G01B 3/56 33/455

1,454,782 A * 5/1923 Wimmer .................. B25D 5/02 33/42

1,660,578 A * 2/1928 Reppell .................... B25D 5/02 33/455

(Continued)

*Primary Examiner* — Yaritza Guadalupe-McCall

(74) *Attorney, Agent, or Firm* — William H. Honaker; Dickinson Wright PLLC

(57) ABSTRACT

An angle divider includes a body portion with a proximate end and a distal end. A distal end pivot point is positioned in the distal end of the body portion. First and second removable arm are pivotally mounted to the distal end pivot point. The arms pivot with respect to the distal end pivot point. An adjustable pivot is mounted for sliding movement within an elongated slot formed in the body portion. Brackets removably interconnect the arms to the adjustable pivot. Movement of the arms results in movement of the adjustable pivot longitudinally along the body portion. A lock locks the adjustable pivot with respect to the body portion, which locks the arms in place with respect to the body portion. The removable arms can be removed from the adjustable pivot point for transport and to split the angle.

21 Claims, 7 Drawing Sheets

(56) References Cited

U.S. PATENT DOCUMENTS

| | | | | | |
|---|---|---|---|---|---|
| 2,222,853 | A * | 11/1940 | Neurohr | G01B 3/56 | 33/1 AP |
| 3,562,919 | A * | 2/1971 | Green | B25H 7/04 | 33/25.1 |
| 4,527,341 | A * | 7/1985 | Schon | G01B 5/24 | 33/25.1 |
| 5,473,821 | A * | 12/1995 | DiMarco | B27B 27/06 | 33/456 |
| 6,604,294 | B1 * | 8/2003 | Farley | B25H 7/00 | 33/27.03 |
| 6,877,238 | B2 * | 4/2005 | Kanaga | B23D 59/002 | 33/455 |
| 7,774,947 | B1 * | 8/2010 | Russo | B23D 47/02 | 33/455 |
| 9,989,346 | B2 * | 6/2018 | Clerc | G01B 3/56 | |
| 10,183,395 | B2 * | 1/2019 | Ursell | B23D 47/04 | |
| 2004/0237320 | A1 * | 12/2004 | Kanaga | B23D 59/002 | 33/455 |
| 2007/0022856 | A1 * | 2/2007 | Paine | B25H 7/00 | 83/522.11 |
| 2007/0227022 | A1 * | 10/2007 | Bruce | B43L 7/10 | 33/455 |
| 2016/0363429 | A1 * | 12/2016 | Clerc | G01B 3/56 | |
| 2017/0157764 | A1 * | 6/2017 | Ursell | B23D 47/04 | |
| 2019/0152091 | A1 * | 5/2019 | Ursell | B27G 5/023 | |

* cited by examiner

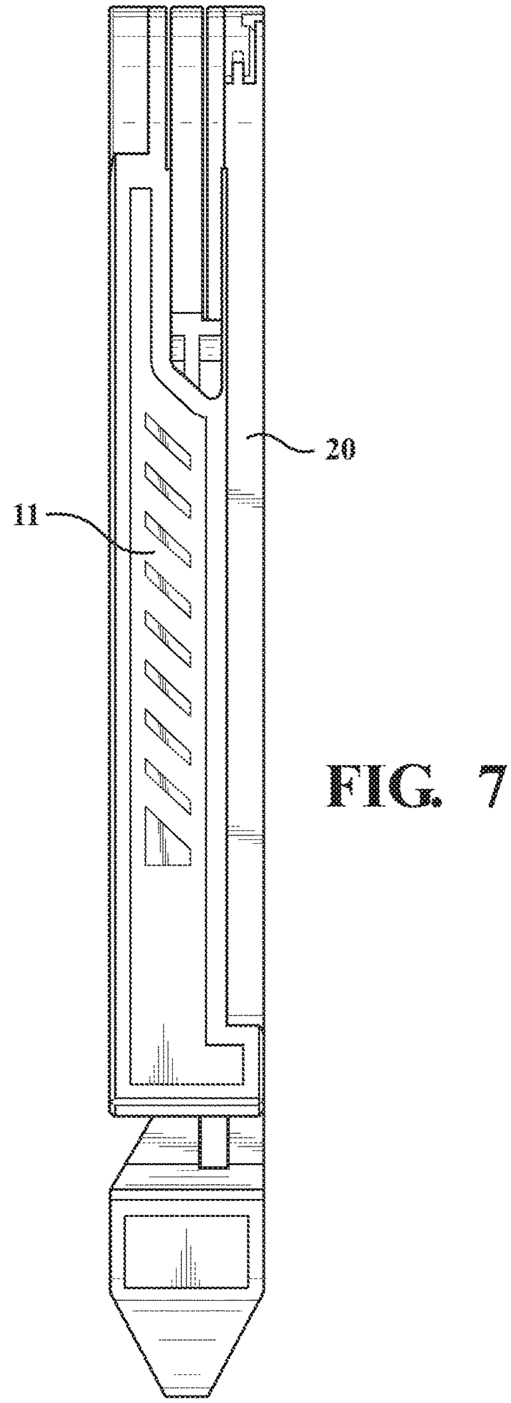
FIG. 7
FIG. 8
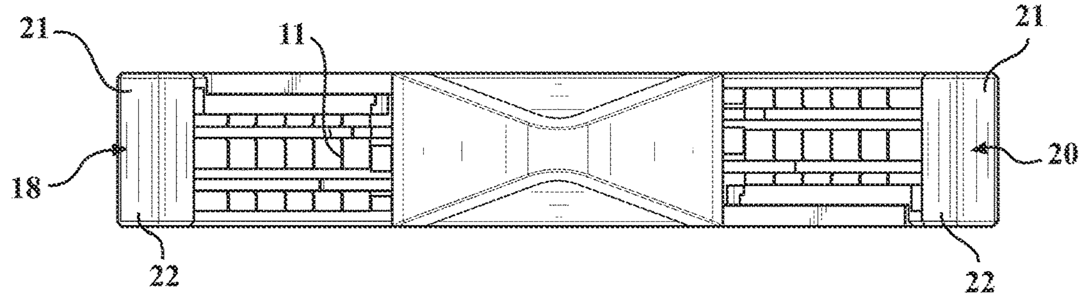

ANGLE DIVIDER FOR MITER SAW

RELATED APPLICATIONS

This application is a Continuation-In-Part application of U.S. Non-Provisional patent application Ser. No. 15/372,551 filed Dec. 8, 2016 which claims the benefit of U.S. Provisional Patent Application Ser. No. 62/264,415, filed Dec. 8, 2015, the entire disclosures of the applications being considered part of the disclosure of this application and hereby incorporated by reference.

STATEMENT REGARDING FEDERALLY SPONSORED RESEARCH

None.

TECHNICAL FIELD

This invention relates generally to a tool for use in determining either the interior or exterior angle between two joined surfaces and then dividing that angle. The tool is particularly beneficial for use with miter saws and the cutting of material to be joined at a specific angle.

BACKGROUND OF THE INVENTION

A common problem when cutting for example molding with a miter saw is that the joined walls and ceilings etc. are not even and the joint is not exactly at right angles. If the molding is cut at right angles, there will be unsightly gaps between the joint of the joined moldings, between the moldings and the wall or ceiling, etc.

What is needed is a tool that can accurately determine the angle of the joint so that it can be easily and accurately transferred to the miter saw so that exact and accurate cuts can be made resulting in no gaps between any joints or surfaces. It is also desired to have a tool that is easy to use and can be used with any type of saw.

BRIEF DESCRIPTION OF THE DRAWINGS

FIG. 7 is a side view of the second embodiment of the angle divider of the present invention with the arms in the closed position.

FIG. 8 is an end view of the second embodiment of the angle divider of the present invention with the arms in the closed position.

DETAILED DESCRIPTION OF A PREFERRED EMBODIMENT

Figure 1:
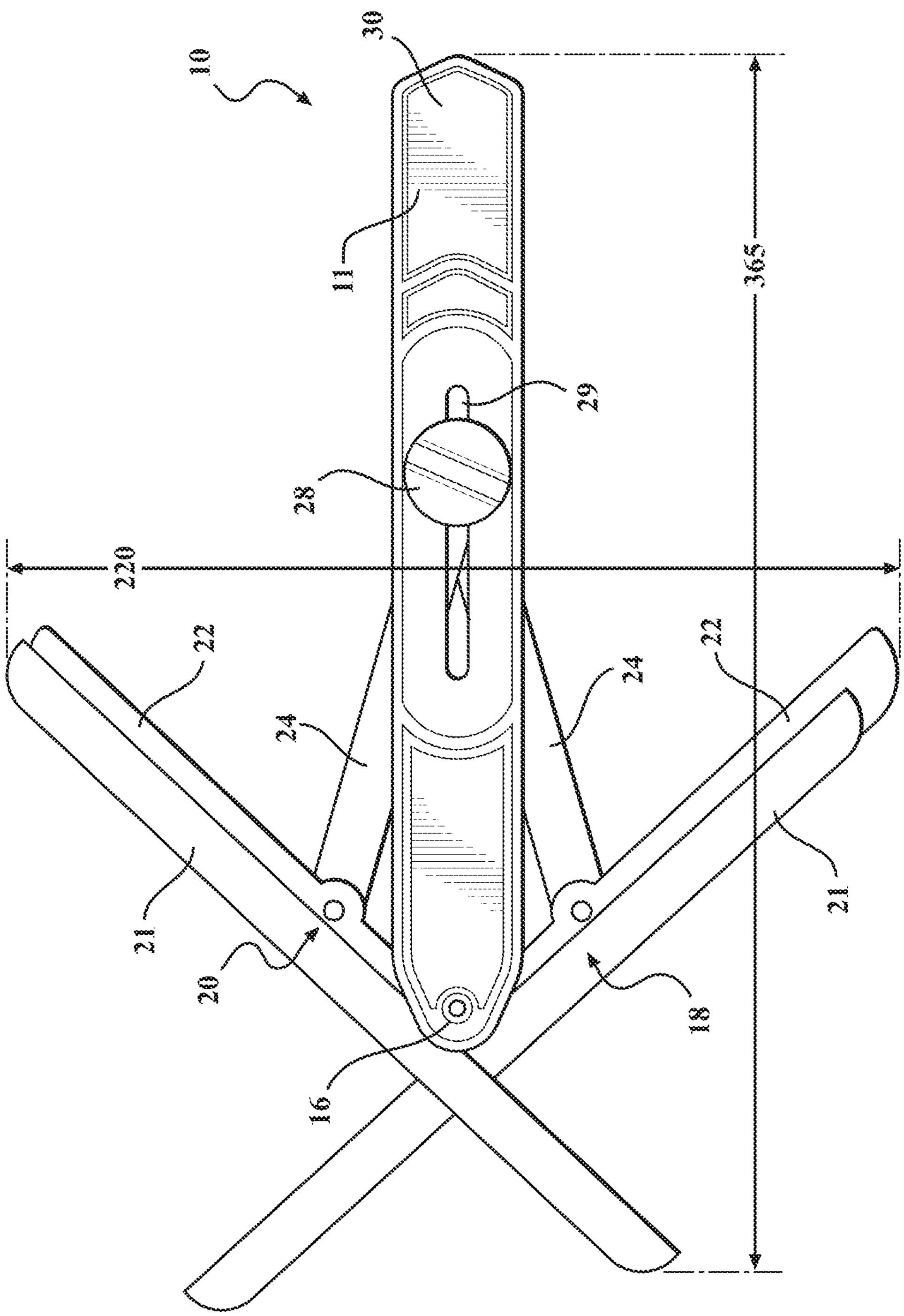
FIG. 1 is a top view of the angle divider of the present invention in the open position.

The angle divider of the present invention is shown generally at 10 in FIGS. 1 through 5. The angle divider 10 includes a body portion 11 having a proximate end 12 and a distal end 14. A distal end pivot point 16 is positioned in the distal end 14 of the body portion 11. A fixed arm 18 and a removable arm 20 are mounted to the distal end pivot point 16. The arms 18 and 20 are mounted to pivot with respect to the distal end pivot point 16.

The arms 18 and 20 each include a sliding finger 21 mounted on tracks 22. The fingers 21 slide with respect to the tracks 22 to extend and retract with respect to the tracks 22 and the body portion 11. In the disclosed embodiment, the tracks 22 have channels that receive the longitudinal edge of the fingers 21 to allow the fingers 21 to slide with respect to the tracks 22.

Brackets 24 connect the arms 18 and 20 to the body 11. The arms 18 and 20 are connected to the body 11 through the tracks 22. The brackets 24 extend between the tracks 22 and an adjustable pivot 28 mounted to the body 11. The brackets 24 pivotally attach to the arms 18 and 20 at track pivot points 25.

Figure 2:
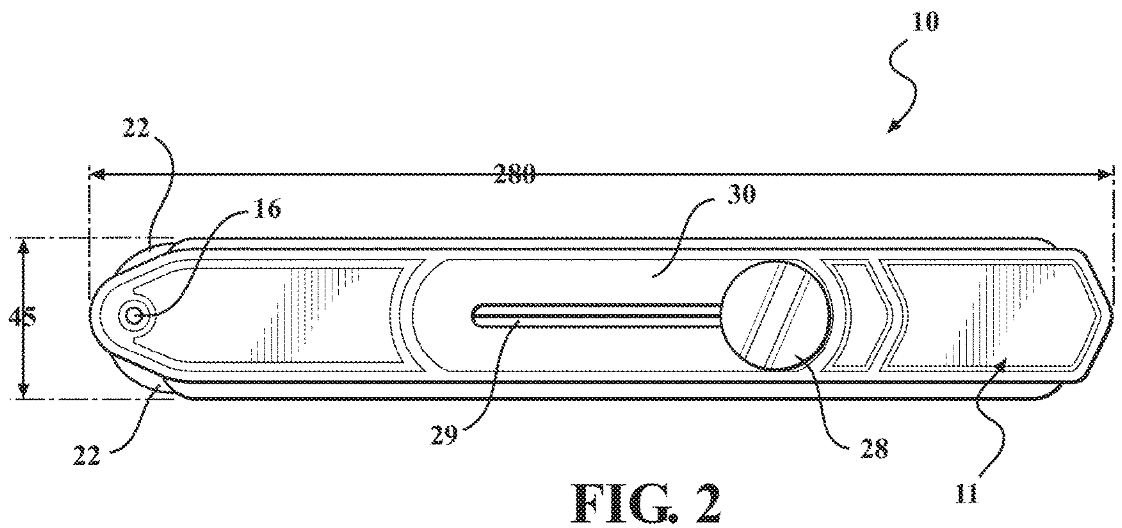
FIG. 2 is a top view of the angle divider of the present invention in the closed position.
Figure 5:
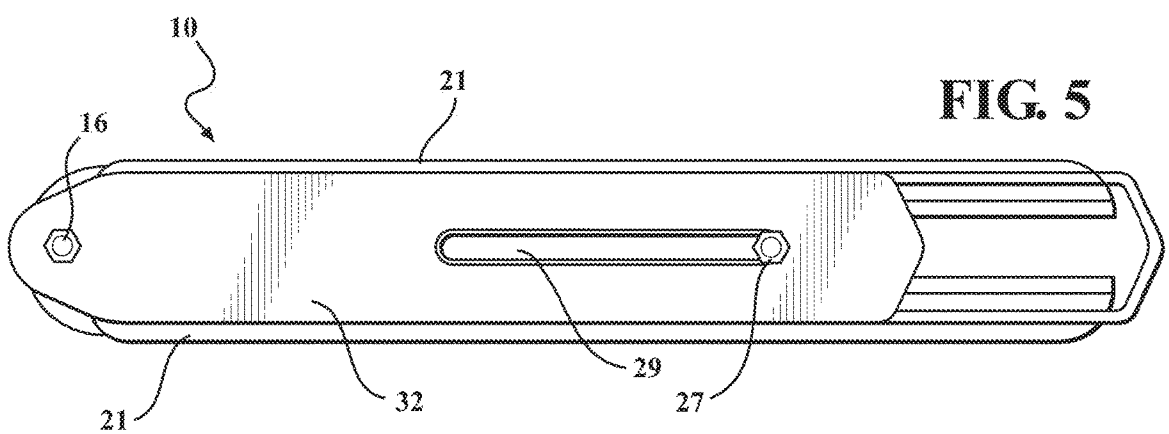
FIG. 5 is a bottom view of the angle divider of the present invention in the closed position.
Figure 6:
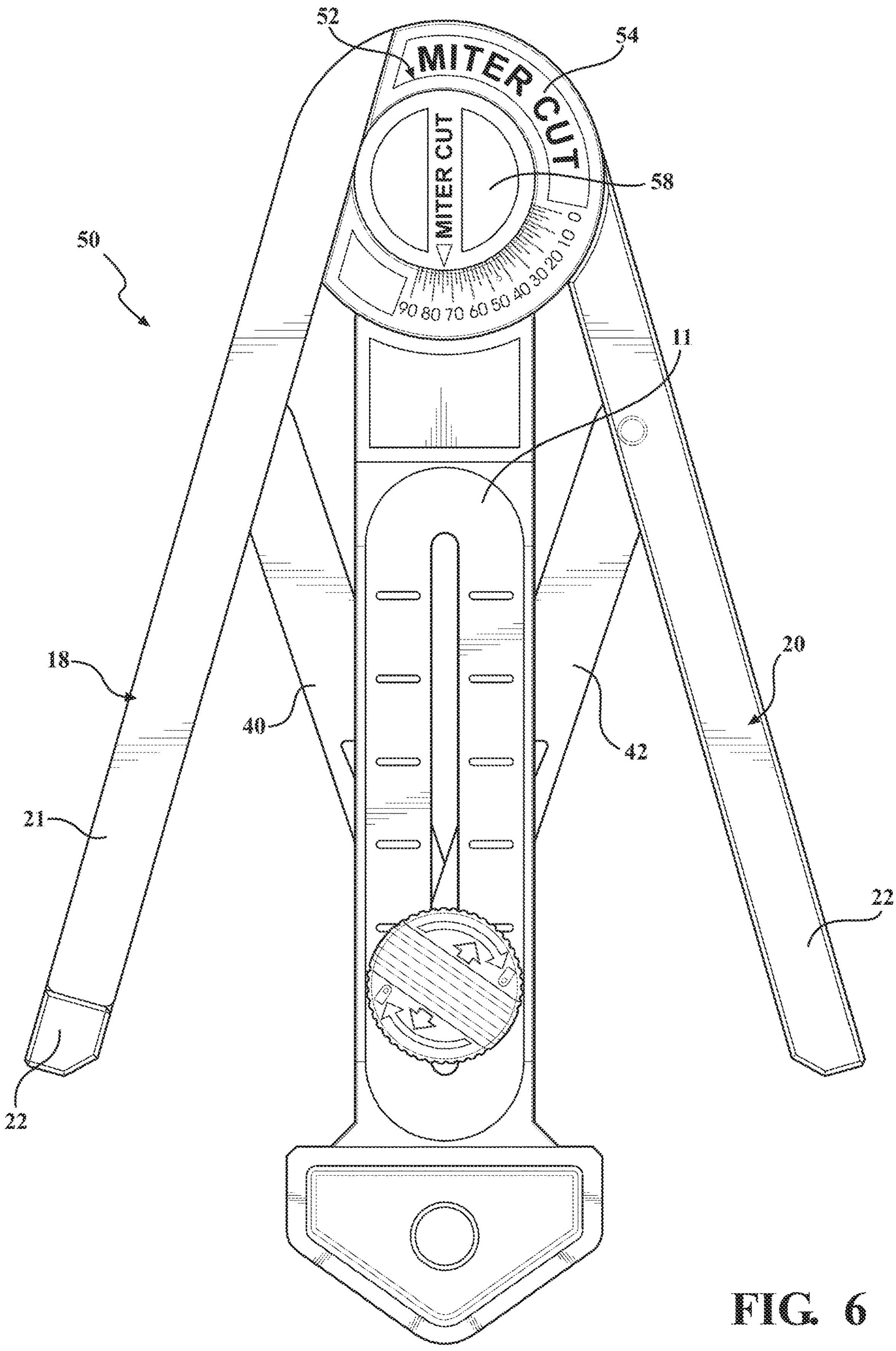
FIG. 6 is a top view of the second embodiment of the angle divider of the present invention with the arms in the closed position.
Figure 9:
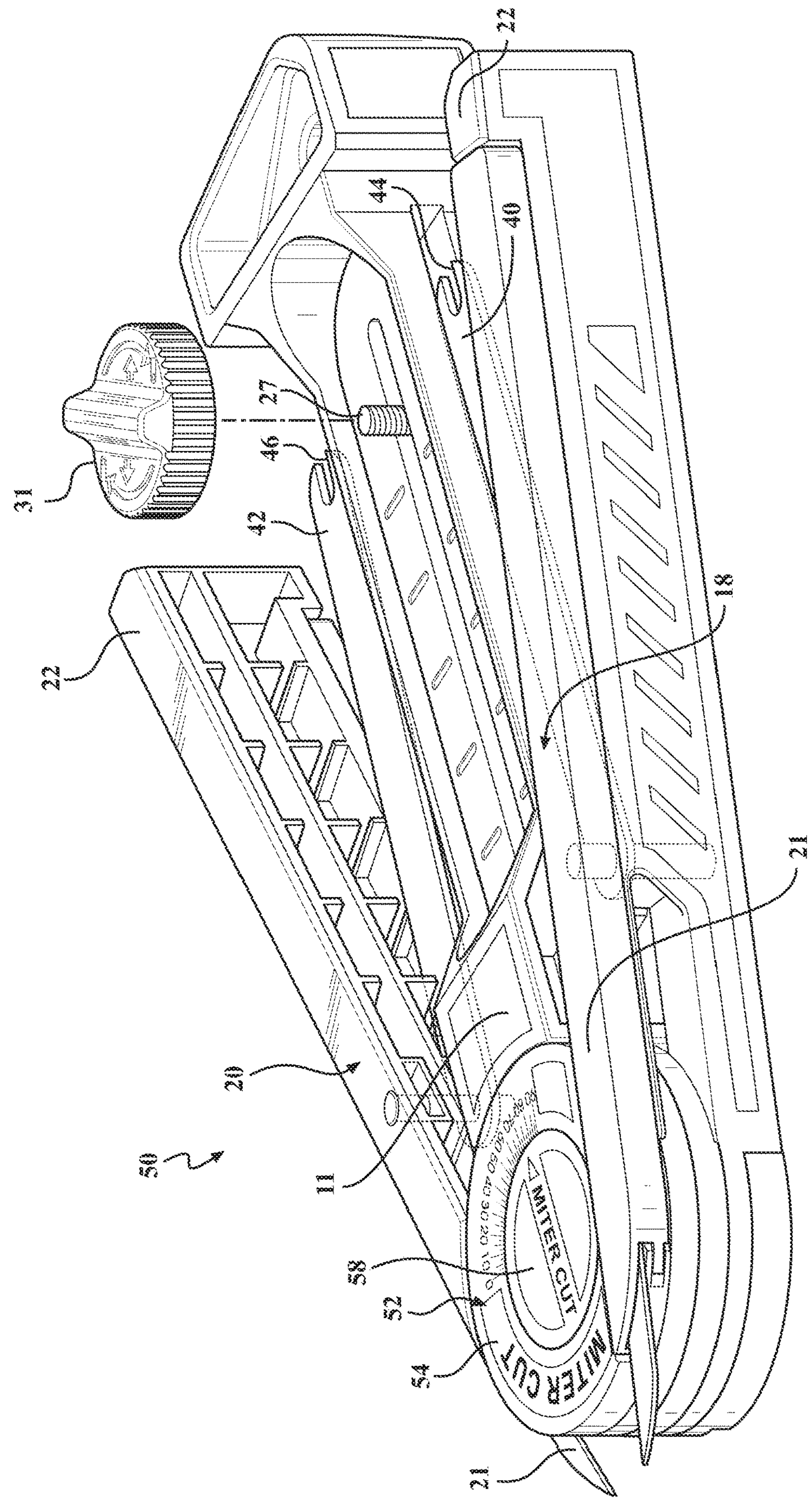
FIG. 9 is a perspective view of the second embodiment with the arms is the open position the sliding fingers extended and the brackets released.

The adjustable pivot 28 includes a lock 26 and a shaft 27, see FIG. 5. The shaft 27 extends through a slot 29. In the disclosed embodiment, the body 11 has a top surface 30 and bottom surface 32 that are spaced from one another. The spacing of the top 30 and bottom 32 creates a cavity 33 for receipt of the arms 18 and 20 when the angle divider is in the closed position as shown in FIGS. 2 and 5. In the disclosed embodiment, the top 30 and bottom 32 are separated by the distal end pivot point 16 and a proximate end wall 33.

As disclosed, the shaft 27 extends through the top 30 and bottom 32. A fastener connects the shaft 27 to the bottom 32 and a lock 26 connects the shaft to the top 30. The lock as disclosed is a knob 31 that can be screwed against the top 30 and lock the position of the shaft 27 with respect to the slot 29. It should be appreciated that other locking mechanisms could be used, for example, a spring loaded latch, a ratchet type lock, etc.

Figure 3:
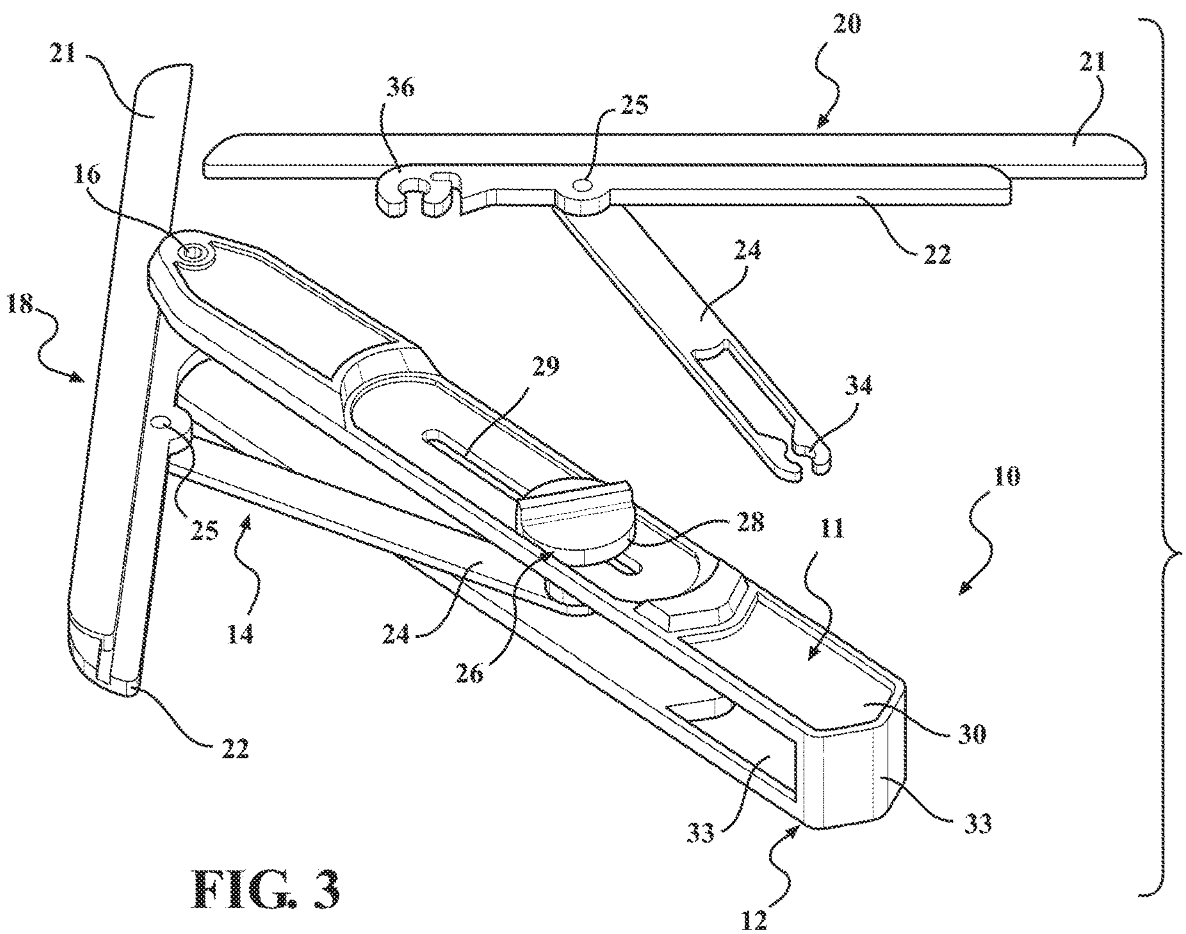
FIG. 3 is a perspective view of the angle divider of the present invention split for use on a miter saw.
Figure 4:
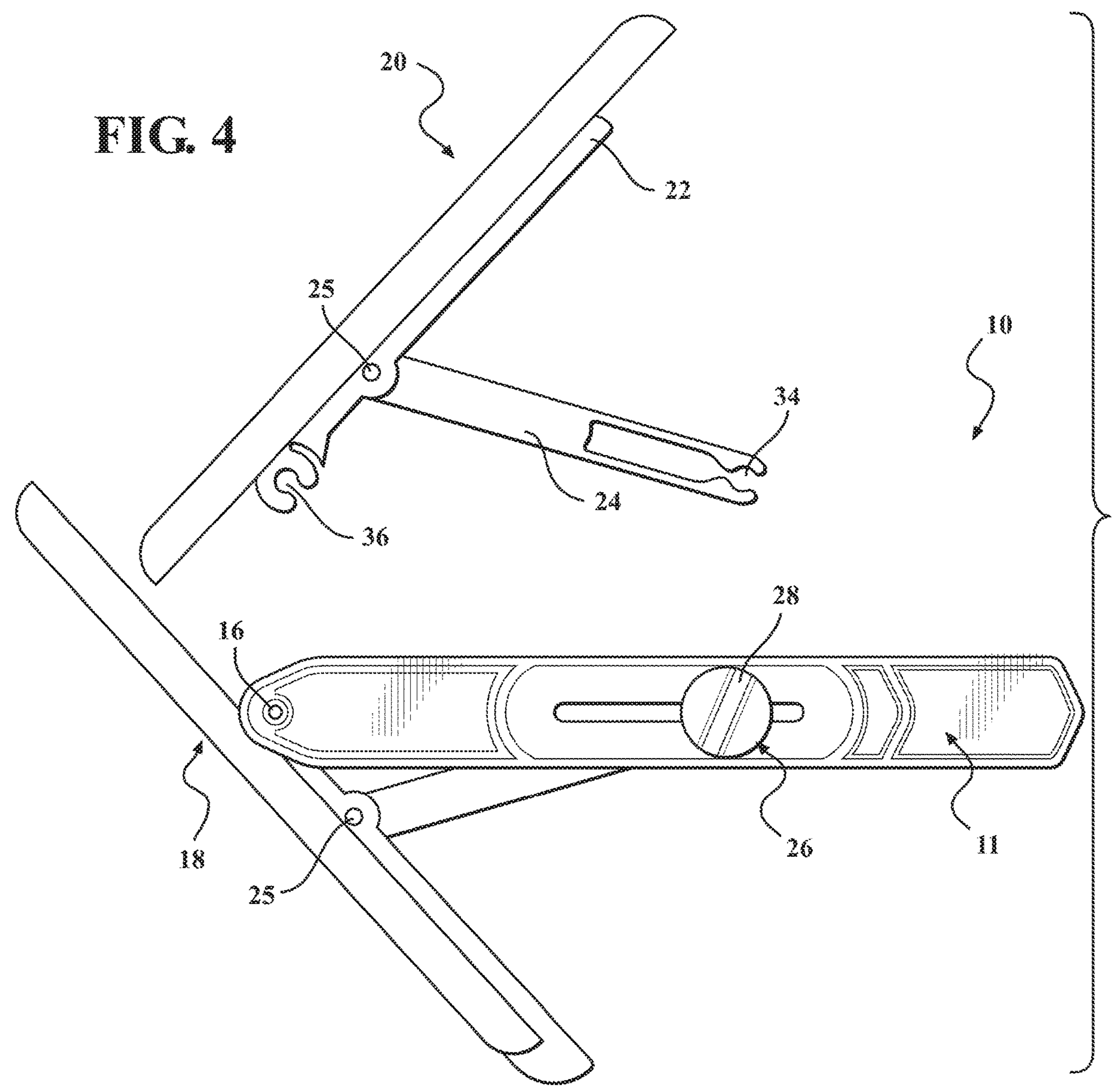
FIG. 4 is a top view of the angle divider of the present invention split for use on a miter saw.

With reference to FIGS. 3 and 4, the removable arm 20 is connected to the distal end pivot point 16 and the shaft 27 by snap fasteners 34 and 36. The snap fasteners 34 and 36 allow the removable arm 20 to be easily removed and reattached as desired.

The angle divider 10 is ideally suited to be used with miter type saws to cut for example molding, door frames, railing caps, etc. The common problem when cutting for example molding is that the joined walls and ceilings etc. are not even and the joint is not exactly at right angles. If the molding is cut at right angles, there will be gaps between the joint of the joined moldings and between the moldings and the wall or ceiling, etc.

To solve this problem, the angle divider 10 of the present invention is used to divide the angle of the joined material and transfer that divided angle to for example a miter saw to cut an exact angle. To use the angle divider 10, the arms 18 and 20 are pivoted out of the body 11 about the pivot point 16, see FIGS. 1 and 2. If the angle is an interior or exterior angle, the fingers 21 are retracted or extended and pivoted about the pivot points to fit against the sides of the joint. Once both fingers 21 are positioned against the sides of the joint, the lock 26 is locked which locks the fixed arm 18 at the desired angle. After the lock 26 is locked, the removable arm 20 is removed from the body 11. This divides the angle in half. The track 22 and bracket 24 are snapped from the pivot point 16 and the shaft 27 to remove the removable arm 20. The body 11 is then positioned against the back wall on for example the left side of the miter saw stand and the blade is adjusted to engage the side of the finger 21. This allows for the cutting of the molding by way of example at the exact ½ angle of the desired angle. The body is then re-positioned on the back wall of the other side, the right side in this example, of the miter saw and another piece of molding is cut to provide the other ½ of the desired angle.

With reference to FIGS. 6 through 11, a further embodiment of the angle divider of the present invention is generally illustrated at 50. In this embodiment, the arms 18 and 20 are connected to the tracks 22 through brackets 40 and 42. The brackets 40 and 42 are removably connected to the shaft 27 by snap fasteners 44 and 46. The snap fasteners 44 and 46 allow the angle to be determined by the arms 18 and 20, locked in position by the knob 31 and then the snap fasteners 44 and 46 can be removed from the shaft 27 and the arms closed for easier transport to the saw. Once at the saw, the snap fasteners 44 and 46 can be reconnected to the shaft 27 to make the desired cuts. Each of the snap fasteners 44 and 46 can also be disconnected separately, and the respective arm 18 and 20 closed. The body 11 is then positioned against the back wall on for example the left side of the miter saw stand and the blade is adjusted to engage the side of the finger 21. This allows for the cutting of the molding by way of example at the exact ½ angle of the desired angle. The body is then re-positioned on the back wall of the other side, the right side in this example, of the miter saw and another piece of molding is cut to provide the other ½ of the desired angle. Or, the other arm is snapped back in place on the sliding pivot point, the opposite arm is disconnected and folded in to make the cut.

The angle divider 50 of the present embodiment includes a dial indicator 52 in place of the pivot 16 of the previous embodiment. The dial indicator 52 has a first disc 54 and a second disc 56 journaled upon a bearing member 58. The arms 18 and 20 extend from the dial indicator 52 with the arm 18 extending from the disc 54 and the arm 20 extending from the disc 56. The arms 18 and 20 can be integrally formed with the discs 54 and 56 or connected to them by snap fit, fasteners, glue, welding, etc.

Figure 11:
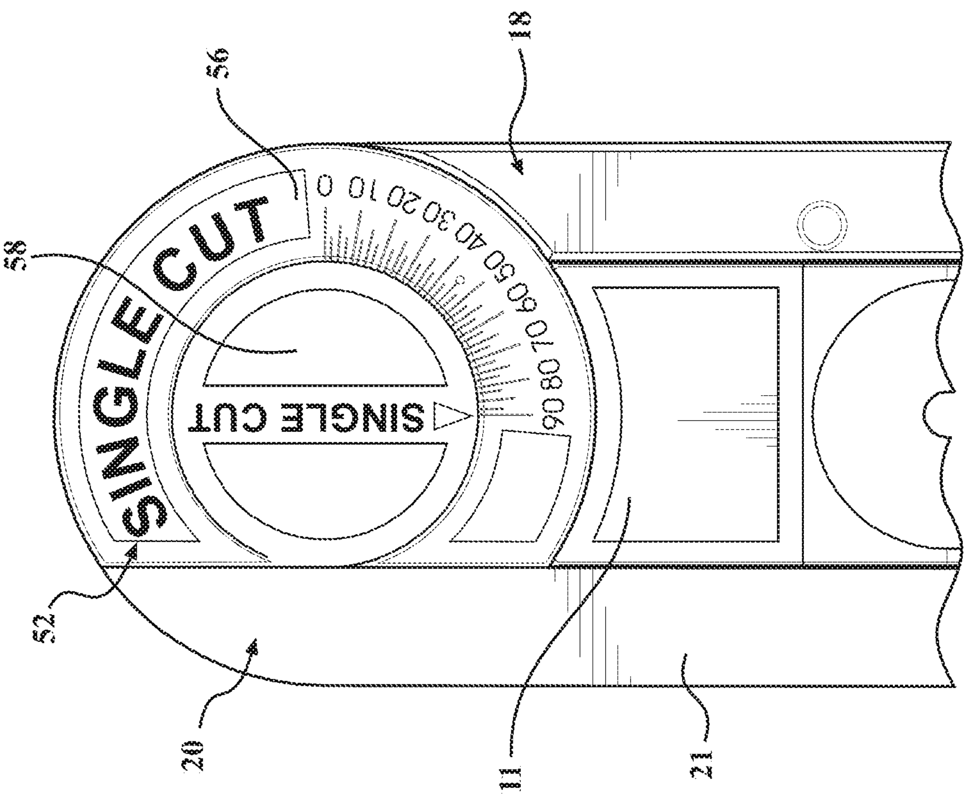
FIG. 11 is a top view of the dial indicator single cut of the angle divider of the second embodiment.
Figure 10:
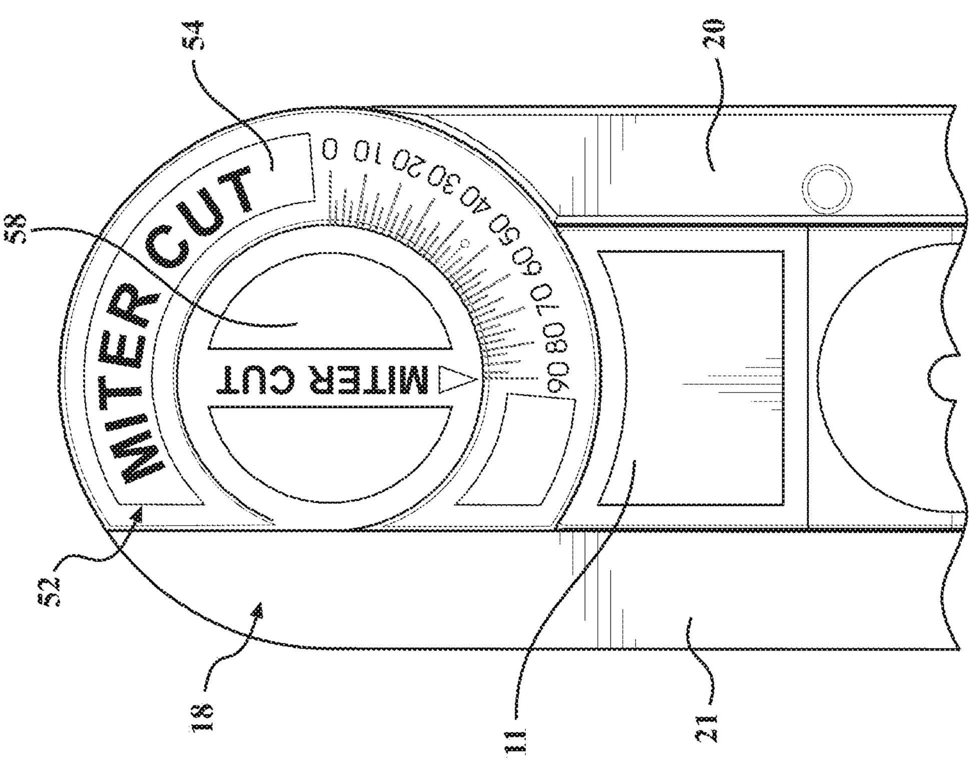
FIG. 10 is a top view of the dial indicator miter cut of the angle divider of the second embodiment.

The discs 54 and 56 have indications on their surfaces as seen in FIGS. 10 and 11. On disc 54 the indications are for miter cuts and indicate the degrees 0 to 90. On disc 56, the indications are for single cuts and indicate degrees 90 to 0 and 0 to 90. Depending upon the cut to be made, the angle divider 50 is positioned with the desired side up and the respective angle can be indicated upon movement of the arms 18 and 20. This indication is important when more than one worker is involved. It allows the user to determine the angle and report it to the other worker to set the saw and make the appropriate cut.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. An angle divider comprising:

a body portion having a proximate end and a distal end;

a distal end pivot point is positioned in the distal end of the body portion;

a first arm and a second arm are pivotally mounted to the distal end pivot point, the first arm and second arm pivot with respect to the distal end;

an adjustable pivot is mounted for sliding movement within an elongated slot formed in body portion;

brackets interconnect first and second arms to adjustable pivot, movement of first and second arms results in movement of said adjustable pivot longitudinally along body portion;

a lock is adapted to lock adjustable pivot with respect to body portion, which locks first and second arms in place with respect to body portion;

said first and second arms are removable from said adjustable pivot point to allow said first and second arms to be pivoted about said distal end pivot point and to split the angle;

whereby said angle divider is used to divide the angle of joined material and transfer of that divided angle to a saw to cut an exact angle to match the joined material or to make straight cuts to material.

2. The angle divider of claim 1, wherein said first and second arms include snap fasteners, said snap fasteners connect to the adjustable pivot such that said first and second arms can be snapped on and off said said adjustable pivot 28.

3. The angle divider of claim 1, wherein said first and second arms each include a sliding finger and a track, said fingers slide with respect to said tracks to extend and retract with respect to said tracks and said body portion.

4. The angle divider of claim 3, wherein said fingers have a longitudinal extending edge, said tracks have longitudinal extending channels that receive the longitudinal edge of the fingers to allow the fingers to slide with respect to the tracks.

5. The angle divider of claim 1, wherein said body portion has a top surface, bottom surface and sides with said first and second arms engaging said sides when said angle divider is in the closed position.

6. The angle divider of claim 5, wherein said adjustable pivot includes a lock and a shaft, said shaft extends through said slot.

7. The angle divider of claim 6, wherein said shaft extends through said top and said bottom; a fastener connects the shaft to the bottom and said lock connects said shaft to said top.

8. The angle divider of claim 7, wherein said lock is a knob that can be screwed against said top and lock the position of said shaft with respect to said slot.

9. The angle divider of claim 1, wherein said adjustable pivot includes a lock and a shaft, said shaft extends through said slot.

10. The angle divider of claim 1, wherein said distal end pivot point is a dial indicator.

11. The angle divider of claim 10, wherein said first and second arms are connected to said dial indicator.

12. The angle divider of claim 10, wherein said dial indicator has a first disc and a second disc jounaled upon a bearing member.

13. The angle divider of claim 12, wherein said first arm is connected to said first disc and said second arm is connected to said second disc.

14. The angle divider of claim 13, wherein said first and second arms each include a sliding finger and a track, said fingers slide with respect to said tracks to extend and retract with respect to said tracks and said body portion.

15. The angle divider of claim 14, wherein said fingers have a longitudinal extending edge, said tracks have longitudinal extending channels that receive the longitudinal edge of the fingers to allow said fingers to slide with respect to said tracks.

16. The angle divider of claim 12, wherein said first disc has indications for miter cuts on one side of said angle divider and said second disc has indications for straight cut on the opposite side of said angle divider.

17. The angle divider of claim 16, wherein said miter cut indications have degrees 0 to 90 and said single cut indications have degrees 90 to 0 and 0 to 90;

whereby said angle divider is positioned with the desired side up and the respective angle can be indicated upon movement of said first and second arms.

18. An angle divider comprising:

a body portion having a proximate end and a distal end;

a distal end pivot point positioned in the distal end of the body portion;

a first arm and a second arms are pivotally mounted to the distal end pivot point, the first arm and second arms pivot with respect to the distal end from a closed position to an angle indication position;

an adjustable pivot mounted for sliding movement within an elongated slot formed in body portion;

brackets removably interconnect first and second arms to said adjustable pivot, movement of first and second arms about said distal end pivot point results in movement of said adjustable pivot longitudinally along body portion;

a lock is adapted to lock adjustable pivot with respect to body portion;

said removable first and second arms are removable from said adjustable pivot point to pivot to said closed position for transport and to split the angle;

whereby said angle divider is used to divide the angle of joined material and transfer of that divided angle to a saw to cut an exact angle to match the joined material.

19. The angle divider of claim 18, wherein said brackets include snap fasteners, said snap fasteners connect to said adjustable pivot 28 such that said first and second arms can be snapped on and off said adjustable pivot 28.

20. The angle divider of claim 18, wherein said adjustable pivot includes a lock and a shaft, said shaft extends through said slot.

21. The angle divider of claim 18, wherein said distal end pivot point is a dial indicator;

said dial indicator has a first disc and a second disc jounaled upon a bearing member;

said first arm is connected to said first disc and said second arm is connected to said second disc;

said first disc has indications for miter cuts on one side of said angle divider and said second disc has indications for straight cut on the opposite side of said angle divider.

* * * * *